R. FULLER.
VEHICLE SPRING.
APPLICATION FILED AUG. 28, 1911.
1,105,192.  Patented July 28, 1914.
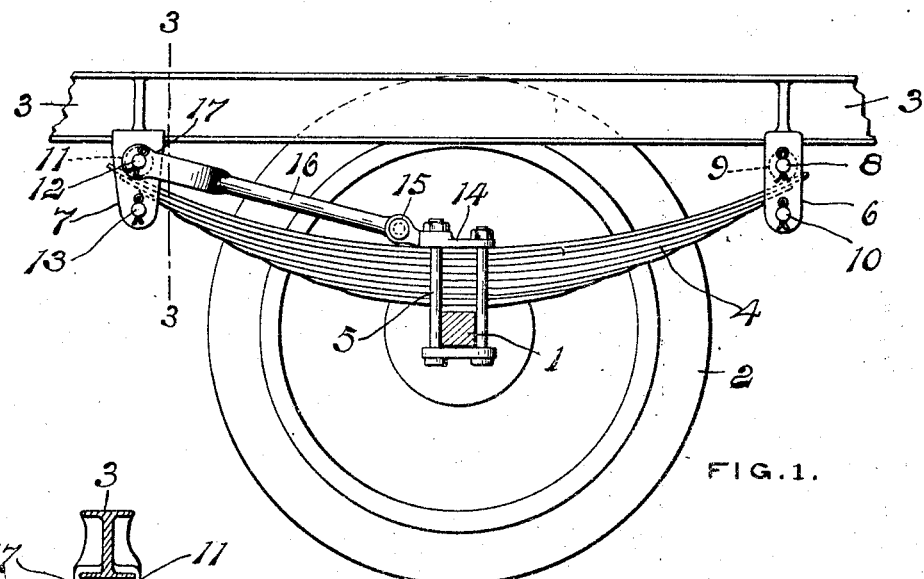
FIG. 1.
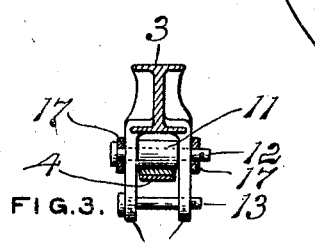
FIG. 3.
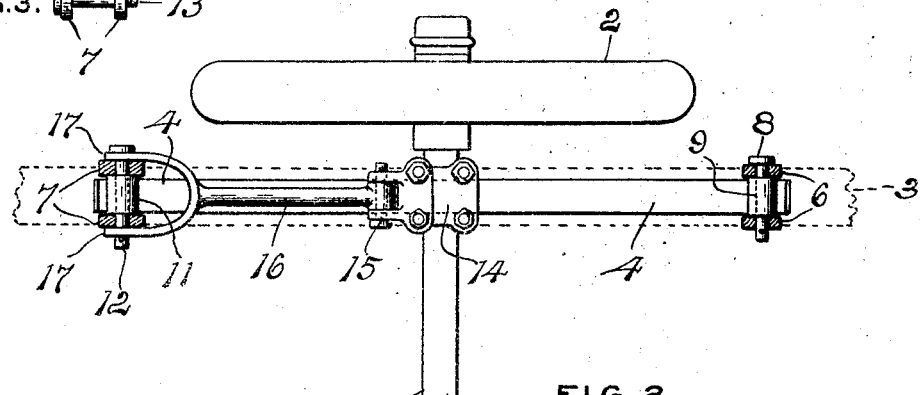
FIG. 2.
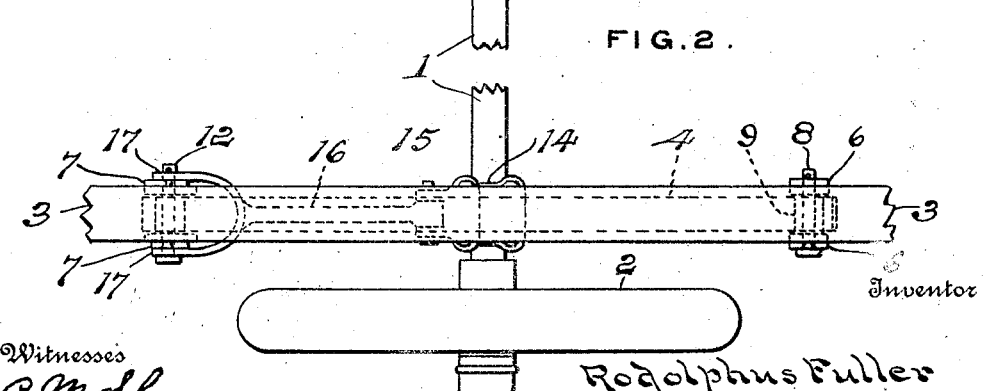
Witnesses
C. M. Shannon
G. E. McBram
Inventor
Rodolphus Fuller
By Barthel & Barthel
Attorneys.

UNITED STATES PATENT OFFICE.

RODOLPHUS FULLER, OF DETROIT, MICHIGAN.

VEHICLE-SPRING.

1,105,192.   Specification of Letters Patent.   Patented July 28, 1914.

Application filed August 28, 1911. Serial No. 646,446.

*To all whom it may concern:*

Be it known that I, RODOLPHUS FULLER, a citizen of the United States of America, residing at Detroit, in the county of Wayne and State of Michigan, have invented certain new and useful Improvements in Vehicle-Springs, of which the following is a specification, reference being had therein to the accompanying drawings.

This invention relates to improvements in spring mechanisms for vehicles and its object is to provide a construction embodying a longitudinally extending leaf spring in which both ends of said spring are unrestricted in their flexing movement under load and said spring serves only to support the load and not as a connection between the axle and frame or body, the invention consisting in the matters hereinafter set forth and more particularly pointed out in the claim, reference being had to the accompanying drawing in which, Figure 1 is a sectional side elevation of a portion of a vehicle showing spring mechanism embodying the invention in place thereon; Fig. 2 is a plan view of the same with portions broken away and in section to show the construction; and Fig. 3 is a sectional detail on the line 3—3 of Fig. 1.

In the common construction and arrangement of semi-elliptic springs, said springs form the connection between the axle and body or frame, being pivotally attached at one end to the frame and rigidly secured intermediate their ends to the axle. One end of each spring is thus held by its pivotal attachment to the frame against free movement under load and the spring is subjected thereby to the strain of holding the frame in position upon the axle. In applicant's construction the frame rests upon the ends of the spring but is in no way attached thereto, the frame being held in position upon the spring by means of a distance member pivotally attached to the frame at one end and pivotally connected at its opposite end to the axle and thus the ends of the spring are preferably free to move under load and the spring is relieved of all strains other than that of supporting the load.

As shown in the drawings 1 represents a vehicle axle provided with supporting wheels 2, and 3 is a vehicle frame of any suitable construction which is supported upon the axle by means of semi-elliptic springs 4, these springs being secured intermediate their ends upon the axle by means of clips 5. Extending downward from each side member of the frame 3 are pairs of parallel ears 6 and 7 between which the ends of the springs extend and are guided.

Extending through openings in the ears 6 which engage the rear ends of the springs, are bolts or pins 8 upon which are sleeved anti-friction rollers 9 between the ears with the upper surface of the springs engaging the under side of the rollers. Pins 10 extend through openings in the ears 6 near their lower ends across beneath the ends of the springs to prevent them from becoming disengaged from between the ears upon extreme rebound of the spring. The forward ends of the springs extend between each pair of ears 7 in engagement with rollers 11 mounted to turn freely upon the pins 12 between said ears, and pins 13 extend across between each pair of ears 7 below the ends of the springs for the same purpose that the pins 10 are provided. The frame and load are thus supported by the rollers 9 and 11 engaging the springs near the free ends thereof.

To form a connection between the axle and the frame and hold said frame in position upon the springs, each of the clips 5 securing the springs to the axle is provided with a clip plate 14 engaging the upper side of the springs and formed with parallel ears 15 at its forward end between which a distance rod 16 is pivoted at one end. From the clip plates the distance rods extend forwardly, directly over the forward ends of the springs and are each forked at their forward ends to embrace the ears 7, each arm of the forked end of the rod being formed with an eye 17 through which the bolt 12 carrying the roller 11 extends, said distance rods being thus pivotally attached at their forward ends to the frame 3. The distance rods being pivotally attached at one end to the clips 5 intermediate the ends of the springs, and pivotally attached at their forward ends to the ears 7 on the frame, they form distance members between the axle and frame and turning upon their pivotal connection with the axle guide the frame in its movement when the springs are flexed by a load carried on the frame.

Obviously changes in the details of construction may be made without departing from the spirit of my invention and I do not limit myself to the particular construction and arrangement of parts as shown and described.

Having thus fully described my invention what I claim is:—

The combination with a vehicle axle having supporting wheels, semi-elliptic springs secured to the axle intermediate their ends, and a vehicle frame having side members supported upon the ends of said springs in the vertical longitudinal plane of said spring, of downwardly extending ears carried by the frame members and between which the ends of the springs extend, distance rods pivotally connected at one end to the springs near their place of attachment to the axle and provided with forked opposite ends to embrace the said ears, said rods extending longitudinally of said springs in the vertical plane thereof between said springs and frame members, pins extending through the ears adjacent to said vehicle frames and attaching the forked ends of the rods thereto, rollers revolubly mounted upon said pins between said ears and engaged by the ends of the springs to form a rolling contact therefor, and pins arranged transversely of said ears below the ends of said springs and adapted to retain the ends of said springs normally between said ears.

In testimony whereof I affix my signature in presence of two witnesses.

RODOLPHUS FULLER.

Witnesses:
 LEWIS E. FLANDERS,
 ANNA C. RAVILER.